United States Patent [19]

Barradas

[11] 4,361,427
[45] Nov. 30, 1982

[54] AIR FRESHENER

[75] Inventor: George Barradas, Greenwich, Conn.

[73] Assignee: Appliance Design Probe Inc., Scarborough, Canada

[21] Appl. No.: 322,518

[22] Filed: Nov. 18, 1981

[51] Int. Cl.³ .............................................. B01D 19/00
[52] U.S. Cl. ........................................ 55/279; 55/316; 55/387; 55/470; 415/102; 417/350
[58] Field of Search ................. 55/279, 316, 387, 467, 55/470, 471–473, 484; 417/350; 415/102

[56] References Cited

U.S. PATENT DOCUMENTS

| | | | |
|---|---|---|---|
| 2,251,649 | 8/1941 | Wichmann | 55/470 |
| 2,325,222 | 7/1943 | Bretzlaff et al. | 417/350 |
| 2,814,432 | 11/1957 | Eiserman | 417/350 |
| 3,120,340 | 2/1964 | Strumpell | 417/350 |
| 3,390,401 | 6/1968 | Matsuyoshi et al. | 417/350 |
| 4,252,547 | 2/1981 | Johnson | 55/279 |

FOREIGN PATENT DOCUMENTS 2146159  3/1973  France ................................. 55/316

Primary Examiner—Bernard Nozick
Attorney, Agent, or Firm—Shoemaker and Mattare, Ltd.

[57] ABSTRACT

There is provided an air filtration apparatus which includes a housing and an internal vertical partition substantially centrally within the housing. The partition divides the housing into two chambers, and an electrical motor is mounted on the partition with coaxial drive shafts extending into the two chambers. Fans are mounted on the drive shafts, and an intake louvre is located outwardly adjacent each fan. A filter panel between each louvre and the corresponding fan takes microscopic particles out of the air, while a further air filtering means above the chambers moves microscopic particles and deodorizes the air.

4 Claims, 3 Drawing Figures

AIR FRESHENER

This invention relates generally to commercial air filtration apparatus of the kind that can be used in home or office, and has particularly to do with the design of an air filtration apparatus which allows for scenting the air as well as filtration, which has a high throughput of air, and which is relatively simple and inexpensive to construct.

BACKGROUND OF THIS INVENTION

Many commercial air filtration devices currently available employ an air blowing means, such as a fan, and position filters and filter media of various kinds either upstream or downstream of the air blowing means, or both. It is also known to provide a chamber in the downstream air flow, which is filled with a scented liquid so that the air leaving the device is given a particular aroma.

However, many of the prior art devices have disadvantages which arise from a lack of symmetry in the construction, and additionally fail to entrain a large enough portion of the air in a room. It is in view of the above two disadvantages that the present structure has been devised.

GENERAL DESCRIPTION OF THIS INVENTION

Accordingly, this invention provides an air filtration apparatus which includes a housing and an internal vertical partition substantially centrally within the housing to divide the space within the housing into two chambers. An electrical motor is mounted on the partition and from the electrical motor two drive shafts extend horizontally to both sides of the partition. An air propelling fan is mounted on each drive shaft within each chamber. The apparatus includes intake louvre means in the housing outwardly adjacent each fan and a filter panel between each louvre means and the corresponding fan. The housing also has an air outlet above the chambers, and air filtering means above the chambers but below the air outlet.

The air filtering means includes a central container for a scent-producing liquid, the chamber having an outlet which can be closed by stopper means. A further chamber surrounds the central container and has filter media as well as inlet and outlet means by which air from the two earlier-mentioned chambers can pass through the further chamber and the media.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
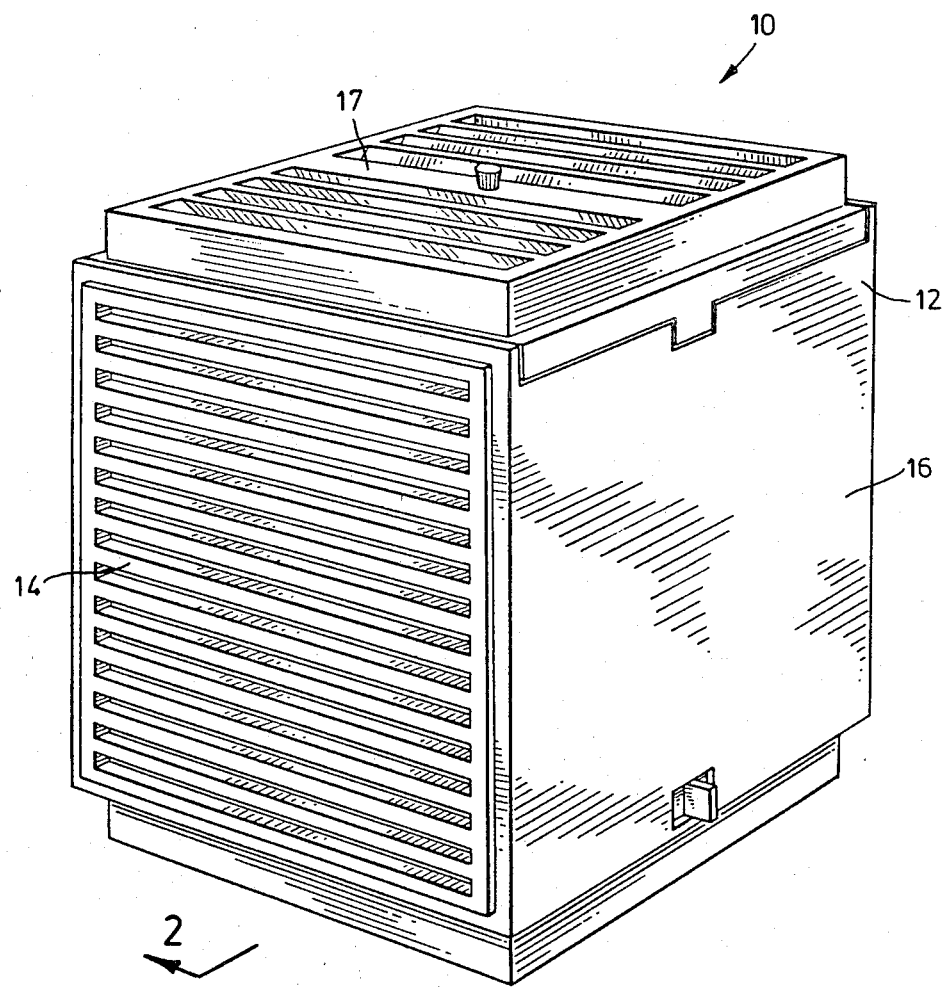
FIG. 1 is a perspective view of an air filtration apparatus embodying this invention.

Attention is first directed to FIG. 1, in which an air filtration apparatus 10 is seen to include a housing 12, two intake walls 14 (only one visible in FIG. 1), two side walls 16 (only one visible in FIG. 1), a top wall 17, and a bottom wall (not visible in FIG. 1). The bottom wall is visible at 19 in FIG. 2.

Figure 2:
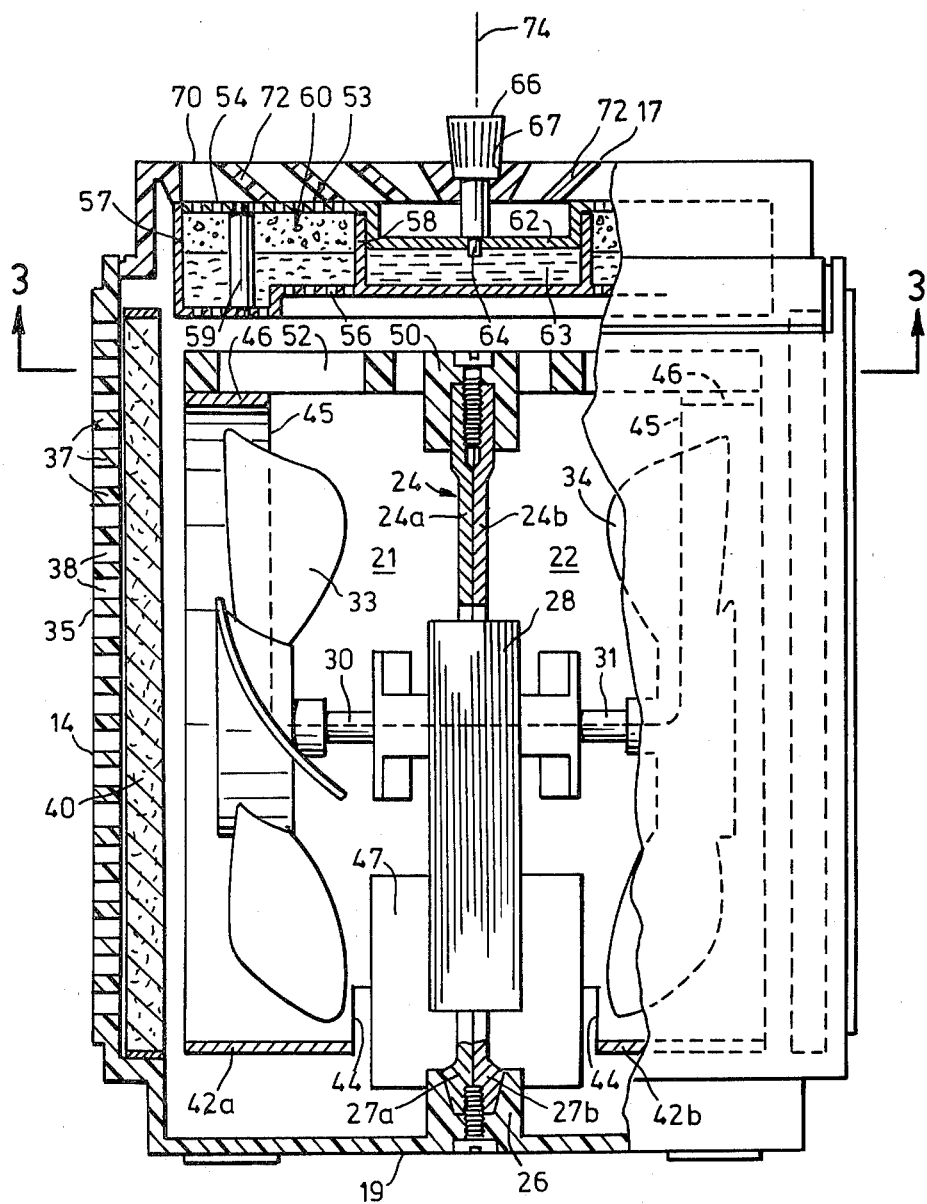
FIG. 2 is a partly sectioned elevational view of the apparatus of FIG. 1.

Looking now at FIG. 2, it will be seen that the general space defined internally of the housing is separated into two chambers 21 and 22 by the provision within the housing of an internal, composite partition 24 which includes two plates 24a and 24b. The partition 24 extends upwardly from the bottom wall 19 to which it is affixed. A boss 26, into which fit complementary bosses 27 and 27b which are an integral part of plates 24a and 24b, provide means for securing the composite partition 24 to the bottom wall 19. As can be seen, an electrical motor 28 is mounted centrally on the partition 24, and has two coaxial drive shafts 30 and 31 extending horizontally to both sides of the partition 24. In the typical construction, the shafts 30 and 31 would be integral and pass entirely through the motor 28 as a single shaft.

Mounted to the shafts 30 and 31 are air propelling fans 33 and 34, respectively, the blades of the fans 33 and 34 being angled such that upon rotation of the shafts 30 and 31 together in a given direction, air will be propelled toward the partition 24 by both fans.

Outwardly adjacent each air propelling fan 33 and 34 is an intake louvre 35, of which only the leftward one can be seen in section in FIG. 2. Each intake louvre 35 has a plurality of horizontal louvres 37 which define between them horizontal slots 38. Immediately inwardly of each intake louvre 35 is a filter panel 40 of a fibrous nature adapted to remove from the inflowing air the macroscropic particles of dust, lint, hair, etc. which may be floating in the air.

Provided within the housing are two coaxial cylinders 42a and 42b which are concentric with the shafts 30 and 31, which are sized to surround with a small tolerance both of the fans 33 and 34, and which are cut away at the bottom where shown by the numeral 44 and cut away at the upper portion where shown by the numeral 45. Each cylinder 42a, 42b is at the same time an integral part of the respective plate 24a, 24b. The cut-aways 45 result in two semi-cylinders 46 surrounding the upper portions of the respective fans 33 and 34. The lower cut-aways 44 are made for the purpose of allowing for the coil 47 of the motor 28.

Located in a horizontal plane and mounted atop the partition 24 above the cylinder 42 is an air-collimating member 50 which defines a plurality of substantially uniformly distributed upright passageways 52 having the effect of aligning the air flow from the chambers 21 and 22 in a vertical direction, and of distributing the air flow.

It will be appreciated that the rotation of the two fans 33 and 34 will bring about a higher-than-atmospheric pressure within the chambers 21 and 22, and will give rise to considerable agitation and turbulence of the air within the chambers. Without the member 50, upward airflow out of the chambers 21 and 22 would not necessarily be uniform, would have many directional components in addition to vertical, and would not necessarily be evenly or uniformly distributed.

The provision of the air-collimating member 50 allows the air to exit from the chambers 21 and 22 in a controlled, uniform, and substantially vertical manner.

The air exiting vertically upwardly from the member 50 then encounters an air filtering means shown generally by the numeral 53 in FIG. 2. The air filtering means 53 includes a circular, apertured upper wall 54, a circular, stepped, apertured lower wall 56, a cylindrical side wall 57, structural tie pieces 59 spaced around the air filtering means 53, an inner cylindrical wall 58, and various filter media contained within the annular chamber 60 defined between the walls 54, 56, 57 and 58. Typically, the filter media in the annular chamber 60 may include activated charcoal and/or silica compounds of known effectiveness in removing odours and microscopic impurities from air. The circular walls 54 and 56 may be apertured in many ways, but preferably the apertures are in the form of concentric slots 61, which are shown in FIG. 2.

The upper wall 54 has a central depressed portion 62, which defines the top of a scent chamber 63, the bottom of which is defined by the central portion of the bottom wall 56. The inner cylindrical wall 58 defines the outer circumference of the scent chamber 63. The scent chamber 63 is sealed with the exception of a single, central aperture which in FIG. 2 is plugged by the extension 64 of a manual plug 66. The manual plug 66 is contoured and rests in an opening 67 in an air outlet panel 70. In the embodiment shown in FIG. 2, the air outlet panel 70 includes a plurality of oblique louvres 72 which direct the air coming upwardly from the chambers 21 and 22 in an oblique upwardly and outwardly direction to either side of a hypothetical vertical plane which coincides with the internal vertical partition 24, and which is shown by the broken line 74.

Figure 3:
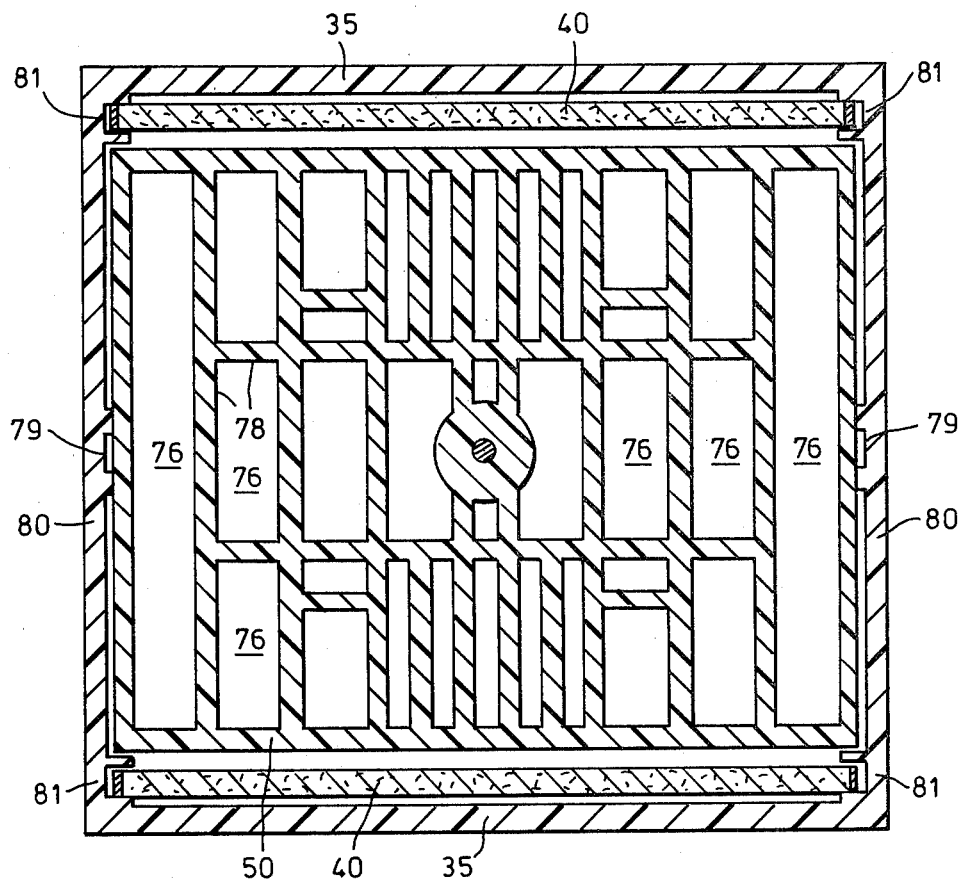
FIG. 3 is a horizontal sectional view taken at the line 3—3 in FIG. 2.

Attention is now directed to FIG. 3, which shows a sectional view taken at the line 3—3 in FIG. 1.

As can be seen, the member 50 includes a plurality of substantially uniformly distributed upright passageways which have the effect of aligning the airflow from the chambers 21 and 22 in a vertical direction, and which also have the effect of distributing the airflow relatively uniformly. The passageways 76 are defined by a plurality of slat members 78 which form a grid pattern as can be seen in FIG. 3.

The embodiments of the invention in which an exclusive property or privilege is claimed are defined as follows:

1. An air filtration apparatus comprising:
   a housing,
   an internal vertical partition substantially centrally within said housing to divide the same into two chambers,
   an electrical motor mounted on said partition and having coaxial drive shafts extending horizontally to both sides of said partition,
   an air propelling fan mounted on each drive shaft within each chamber,
   intake louvre means in the housing outwardly adjacent each fan,
   a filter panel between each louvre means and the corresponding fan,
   an air outlet in the housing above the chambers, and
   air filtering means above the chambers but below the air outlet, the air filtering means including a central container for a scent-producing liquid, an outlet from said central container, stopper means for manually opening and closing said outlet, and a further chamber surrounding said central container, the further chamber containing filter media and having inlet and outlet means by which air from said two first-mentioned chambers can pass through said further chamber and media.

2. The invention claimed in claim 1, in which there is provided, between the chambers and the air filtering means, an air-collimating member which defines a plurality of substantially uniformly distributed upright passageways having the effect of aligning the air flow from the chambers in a vertical direction and of distributing the air flow.

3. The invention claimed in claim 2 in which the air-collimating member has a grid pattern of horizontally elongated integral slots defining said upright passageways.

4. The invention claimed in claim 1, claim 2 or claim 3, in which the said air outlet above the chambers and the air filtering means includes louvres which direct the air obliquely upwardly and outwardly to either side of a hypothetical vertical plane coincident with internal vertical partition, and in which said further chamber is substantially annular.

* * * * *